(12) United States Patent
Tokuyama et al.

(10) Patent No.: US 6,552,877 B2
(45) Date of Patent: Apr. 22, 2003

(54) MAGNETIC-HEAD SUPPORTING MECHANISM

(75) Inventors: Mikio Tokuyama, Tsukuba (JP); Yukio Katou, Ibaraki-ken (JP); Jyousei Shimizu, Odawara (JP); Yasuo Kojima, Odawara (JP); Hiroshi Nishida, Kanagawa-ken (JP); Kouki Uefune, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/812,788

(22) Filed: Mar. 15, 2001

(65) Prior Publication Data

US 2001/0009489 A1 Jul. 26, 2001

Related U.S. Application Data

(62) Division of application No. 09/140,350, filed on Aug. 26, 1998, now Pat. No. 6,226,153.

(30) Foreign Application Priority Data

Aug. 26, 1997 (JP) .............................................. 9-229091

(51) Int. Cl.[7] .................................................. G11B 5/60
(52) U.S. Cl. .................................................. 360/245.7
(58) Field of Search ........................... 360/245.7, 245.9

(56) References Cited

U.S. PATENT DOCUMENTS

| | | | |
|---|---|---|---|
| 4,724,500 A | 2/1988 | Dalziel | |
| 5,333,085 A | 7/1994 | Prentice et al. | |
| 5,519,552 A | * 5/1996 | Kohira et al. | 360/104 |
| 5,768,062 A | * 6/1998 | Anderson et al. | 360/104 |
| 5,838,517 A | 11/1998 | Frater et al. | |
| 5,877,920 A | 3/1999 | Resh | |
| 5,959,807 A | 9/1999 | Jurgenson | |

FOREIGN PATENT DOCUMENTS

| | | |
|---|---|---|
| JP | 8-102159 | 4/1996 |

OTHER PUBLICATIONS

"A Study of Head–Disk Interface Shock Resistance", T. Kouhei et al, File Memory Laboratory, Fujitsu Limited, Japan, IEEE Transactions on Magentics, vol. 31, No. 6, 11/95.

* cited by examiner

Primary Examiner—Robert S. Tupper
(74) Attorney, Agent, or Firm—Antonelli, Terry, Stout & Kraus, LLP

(57) ABSTRACT

If a large external impact is applied to a magnetic disc apparatus, a slider jumps from a disc surface and rotates. When the slider jumps and rotates, its edges re-contact the disc surface to damage this surface. To reduce the rotation angle of the slider to control its position if an impact is effected, the present invention provides a roof on a load arm to reduce the contact angle at which the slider contacts the disc surface in order to relax the impact upon a contact.

6 Claims, 15 Drawing Sheets

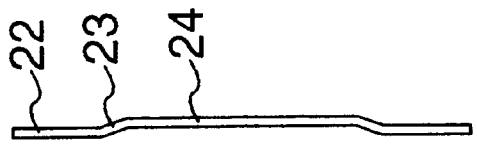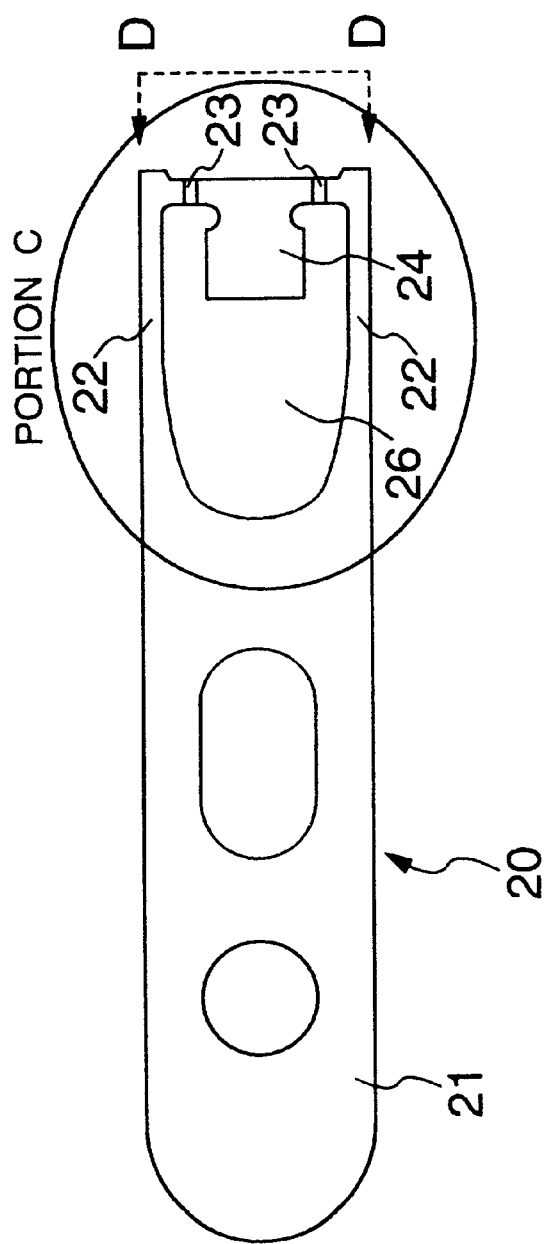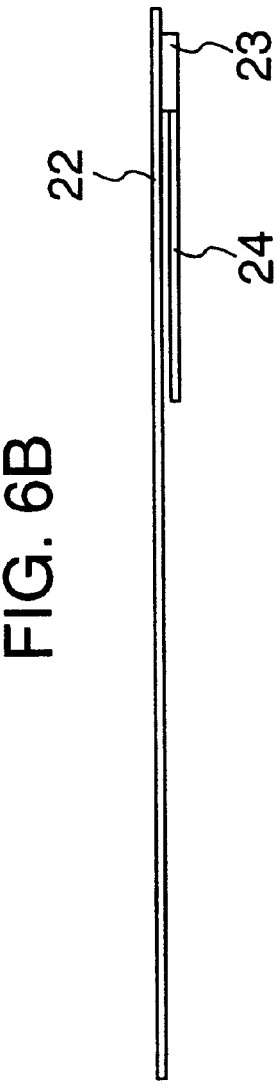

FIG. 10A
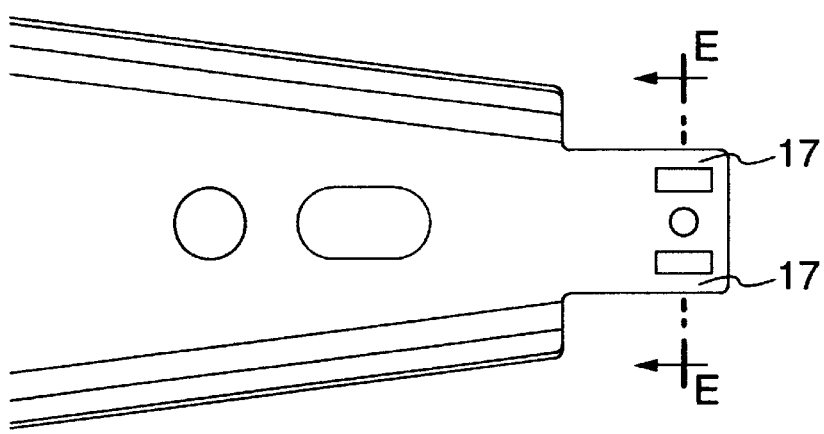
FIG. 10A1
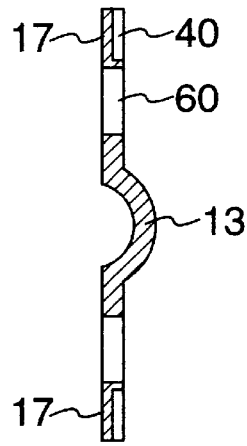
CROSS SECTION
TAKEN ALONG
LINE E-E
(ENLARGED)
FIG. 10B
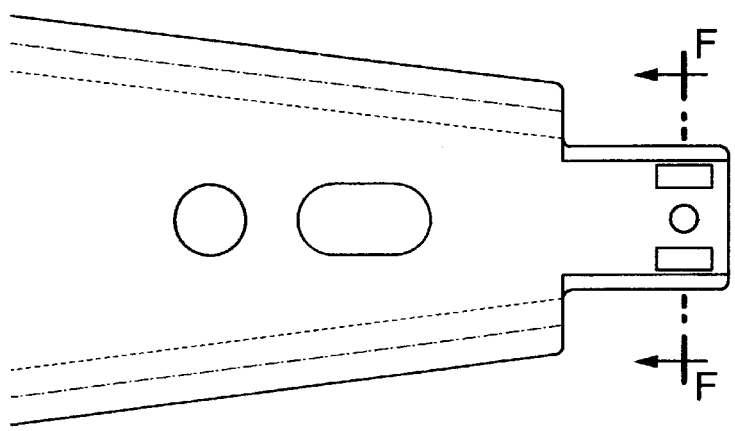
FIG. 10B1
CROSS SECTION
TAKEN ALONG
LINE F-F
(ENLARGED)

CROSS SECTION
TAKEN ALONG
LINE E-E
(ENLARGED)

FIG. 14A
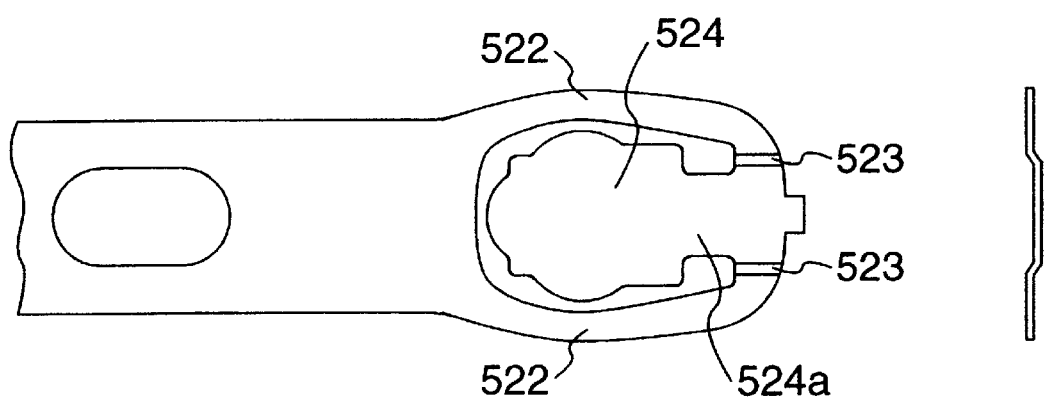
FIG. 14C
FIG. 14B
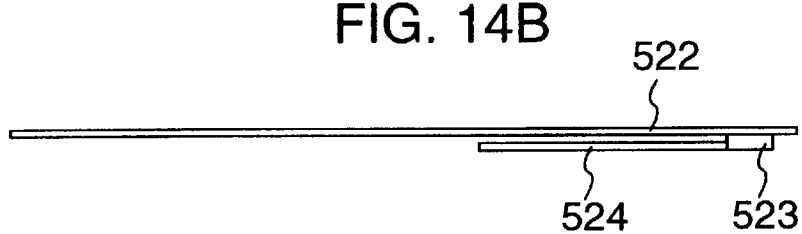

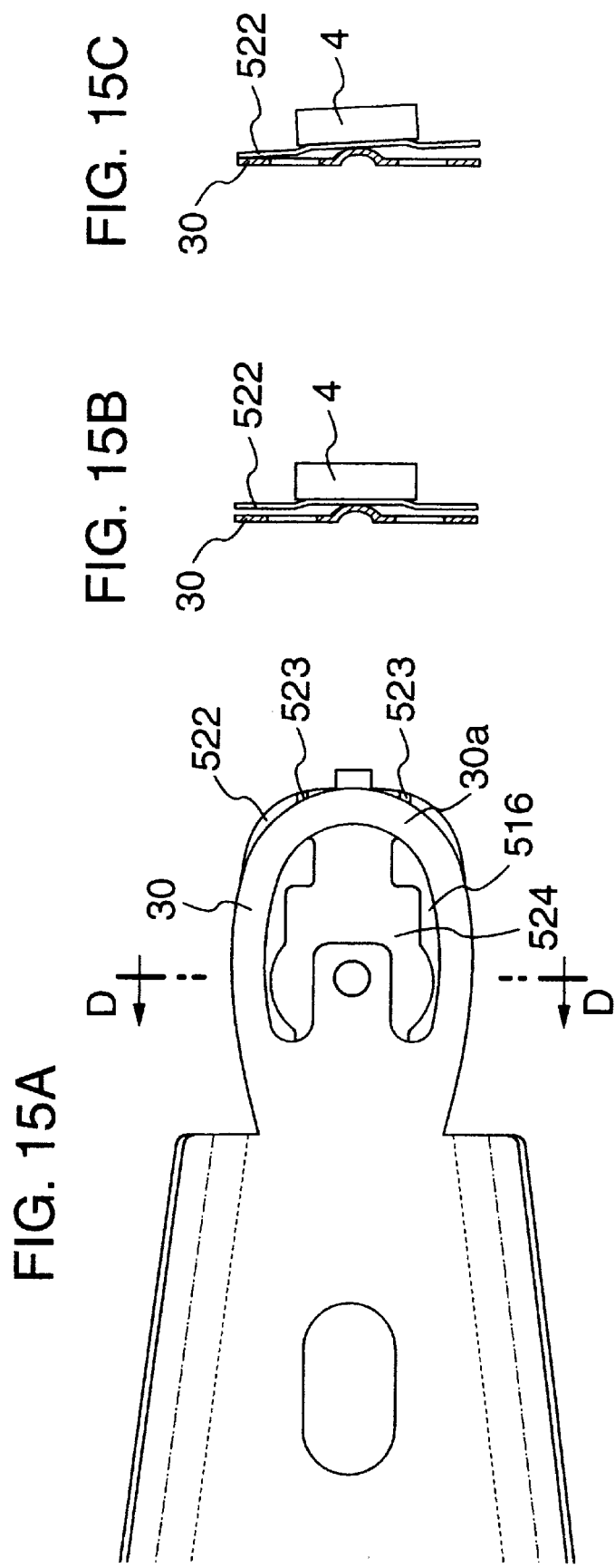

MAGNETIC-HEAD SUPPORTING MECHANISM

CROSS REFERENCE TO RELATED APPLICATION

The present invention is a divisional application of U.S. application Ser. No. 09/140,350, filed Aug. 26, 1998, now U.S. Pat. No. 6,226,153, the subject matter of which is incorporated by reference herein.

BACKGROUND OF THE INVENTION

1. Field of the Invention

The present invention relates to a magnetic-head supporting mechanism for a magnetic-disc apparatus, and in particular, to a magnetic-head supporting mechanism that is excellent in impact resistance.

2. Description of the Related Art

It has been reported that when a large impact is applied to a conventional magnetic-disc apparatus in the direction perpendicular to a disc surface, a slider jumps up from the magnetic disc surface, is tilted while floating, and falls from the angle of a slider floating rail to contact and damage the disc surface (IEEE TRANSACTION ON MAGNETICS Vol. 31, No. 6, pp. 3006 to 3008: NOVEMBER, 1995). This article also reports that a "jump stop" is effectively provided on the slider in order to reduce the damage to the disc caused by an impact.

In addition, JP-A-8-102159 discloses a mechanism comprising a pin protrusion (a limiter section) on a cover or on a base of a magnetic-disc apparatus wherein if the magnetic-disc apparatus is subjected to an impact to oscillate a suspension having a magnetic head at its free end, the free end of the suspension contacts the pin protrusion and is stopped from being further displaced toward the base or cover.

According to the conventional mechanism, if the slider is subjected to an impact and leaves the disc surface, the jump height is restricted by the jump stop or pin protrusion to a predetermined value or less. An object of this configuration is to reduce the speed or acceleration at which the slider collides against the disc in order to reduce the damage to the slider and disc upon the impact, thereby improving the impact resistance of the magnetic-disc apparatus.

On the other hand, the degree of damage depends on the magnitude of the speed and acceleration at which the slider contacts the disc as well as the extent of the contact area. That is, the contact area significantly varies depending on whether a floating surface (a surface that is opposed to the disc surface and on which a floating force is effected) of the slider contacts the disc surface in parallel or the slider rotates and contacts the disc surface at the corners of its floating surface or at its bleed surface (a surface that is opposed to the disc surface and on which a floating force is not effected). Thus, even if the slider contacts the disc surface at the same speed and acceleration, the contact area pressure (stress) significantly varies depending on the contact areas of the slider and disc surface, that is, the position of the slider in which it collides against the disc surface, resulting in significantly different degrees of damage. The prior art does not take this point into account.

OBJECT AND SUMMARY OF THE INVENTION

In view of this point, it is an object of this invention that when the magnetic-disc apparatus is subjected to a large impact to cause the slider to jump from the disc surface and the slider then re-contacts the disc surface, the contacting position of the slider is controlled to prevent the contact area from being reduced in order to reduce contact damage, thereby improving the impact resistance.

In other words, when the magnetic-disc apparatus is subjected to an impact to cause the slider to jump and the slider then re-contacts the disc surface, the position (angle and state) of the slider is controlled to provide a sufficient contact area (prevent the contact area from being reduced) in order to reduce the contact area pressure (stress), that is, damage.

It is another object of this invention to improve the impact resistance of the magnetic-disc apparatus and to provide a magnetic-head supporting mechanism that allows the slider to be easily mounted on the suspension and that has an excellent assembly capability.

To achieve these objects, the magnetic-head supporting mechanism according to this invention is composed of a slider on which a magnetic head is mounted; and a suspension that holds the slider and that presses the slider against the disc surface from the rear surface of the slider (the surface opposite to the disc-opposed surface), the suspension consisting of a gimbal (also referred to as a "flexure") and a load beam.

The gimbal is composed of a mounting portion on which the slider is mounted (normally, joined with an adhesive); a stage portion that connects to one end of the mounting portion; two flexible finger portions extending along the respective sides of the mounting portion from the other end of the.stage portion; and a joint portion that connects to the other end of the flexible finger portions to join the load beam and that is joined with the tip of the load beam (normally by means of spot welding).

The gimbal has a low rigidity sufficient to avoid restraining the movement of the slider in the out-of-plane direction perpendicular to the floating surface of the slider, (perpendicular to the floating surface) while having a high rigidity in the in-plane direction (parallel to the floating surface).

The load beam consists of an arm mounting portion, a spring portion, and a flange portion, and the joint portion of the gimbal is joined with the tip of the flange portion. On the other hand, the other end of the flange portion connects to the spring portion, and the other end of the spring portion connects to the arm mounting portion that is mounted on an arm portion that is very rigid. A load generated in the spring portion is transmitted through the flange portion, via a pivot (a protrusion) provided at the tip of the flange portion to protrude in the slider direction, to the mounting portion of the gimbal mounted on the rear surface of the slider. Since the mounting portion is joined with the rear surface of the slider, the load transmitted to the mounting portion acts to press the slider. The load generated in the spring portion is generated by bending the spring through a predetermined angle prior to installation in the magnetic-disc apparatus so that the spring is installed approximately in parallel to the disc surface.

The slider is mounted on the load beam via the gimbal, as described above, and is pivotally supported by the pivot, so it freely rotates around the pivot in the out-of-plane direction perpendicular to the floating surface.

The magnetic head supporting mechanism having the above mechanism has a roof portion formed by extending the tip of the flange portion of the load beam to the rear surface of the slider. Specifically, if the roof portion is projected onto the gimbal, its size is slightly smaller than or approximately equal to that of the gimbal. In addition, the roof portion is formed by integrally extending the flat portion of the flange portion, and is normally prevented from contacting the flexible finger portions and stage portion of the gimbal. That is, the roof portion does not restrain the movement of the slider.

According to this configuration, even when a large impact is applied to the magnetic-disc apparatus to cause the slider to jump from the disc surface and to start rotating around the pivot through a large angle, the gimbal, which rotates with the slider, contacts the roof portion to restrict the rotation of the slider. This enables the position (state) of the slider in which it contacts the disc surface after a jump to be controlled. Specifically, the substantial rotation of the slider causes the edges of the bleed surface of the slider (the four corners of the slider) or of the floating surface to contact the disc surface, thereby preventing the disc from being damaged due to a high contact area pressure (stress) caused by a small contact area.

BRIEF DESCRIPTION OF THE DRAWINGS

FIG. 6A is a top view of a gimbal shape according to this invention;

FIG. 6B is an enlarged view of a portion C in FIG. 6A;

FIG. 6C shows FIG. 6A as seen from direction D—D;

FIG. 10A is a top view of a load beam according to a second embodiment of this invention and FIG. 10A1 is a cross-sectional view thereof;

FIG. 10B is a bottom view of the load beam according to the second embodiment of this invention and FIG. 10B1 is a cross-sectional view thereof;

FIG. 14A is a top view of a gimbal portion according to the fifth embodiment of this invention;

FIG. 14B is a side view of FIG. 14A;

FIG. 14C is an end view of FIG. 14A;

FIG. 15A shows a general configuration of the fifth embodiment of this invention;

FIG. 15B is a sectional view of FIG. 15A taken along line D—D;

FIG. 15C is a sectional view of FIG. 15A taken along line D—D, showing a maximum rotation state;

DESCRIPTION OF THE EMBODIMENTS

A first embodiment of this invention is described with reference to FIGS. 1 to 9.

Figure 1:
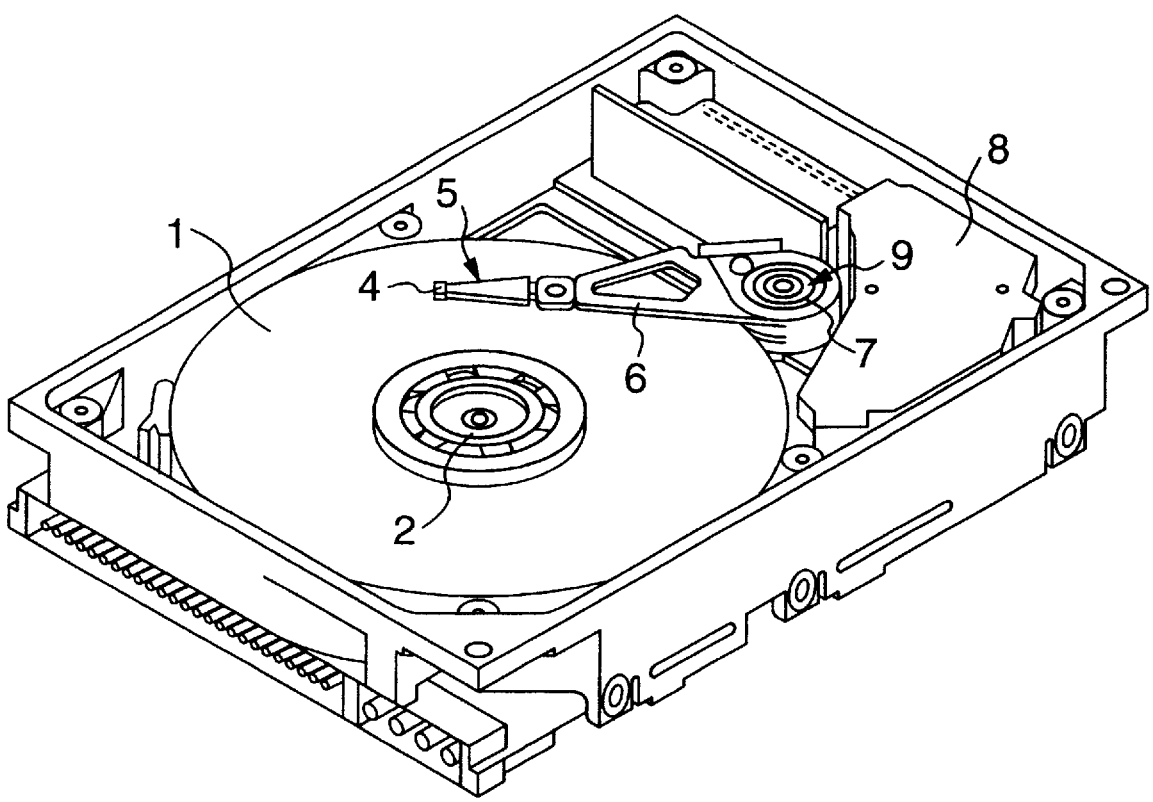
FIG. 1 is a general view of a magnetic-disc apparatus according to this invention.

FIG. 1 shows a general view of a magnetic-disc apparatus in which a magnetic-head supporting mechanism according to a first embodiment of this invention is mounted.

A magnetic disc 1 on which information is recorded is mounted on a spindle 2. A magnetic head (not shown) used to record and reproduce information on and from the magnetic disc is mounted on a slider 4 of a magnetic-head supporting mechanism 5. The magnetic-head supporting mechanism 5 is joined with the arm 6. The magnetic head is placed at a predetermined radial position by a carriage 9 consisting of a pivot bearing 7 and a voice coil motor 8. These mechanisms are mounted in a lunch-box-shaped base and are sealed by a cover (not shown). The present magnetic-head supporting mechanism improves impact resistance to enable recording and reproduction at a high density even when the magnetic-disc apparatus is configured as a portable type.

A magnetic discs 1 on which information is recorded is laminated on a spindle 2. A magnetic head (not shown) used to record and reproduce information on and from the magnetic disc is mounted on a slider 4 of a magnetic-head supporting mechanism 5. The magnetic-head supporting mechanism 5 is joined with the arm 6. The magnetic head is placed at a predetermined radial position by a carriage 9 consisting of a pivot bearing 7 and a voice coil motor 8. These mechanisms are mounted in a lunch-box-shaped base and are sealed by a cover (not shown). The present magnetic-head supporting mechanism improves impact resistance to enable recording and reproduction at a high density even when the magnetic-disc apparatus is configured as a portable type.

Figure 2:
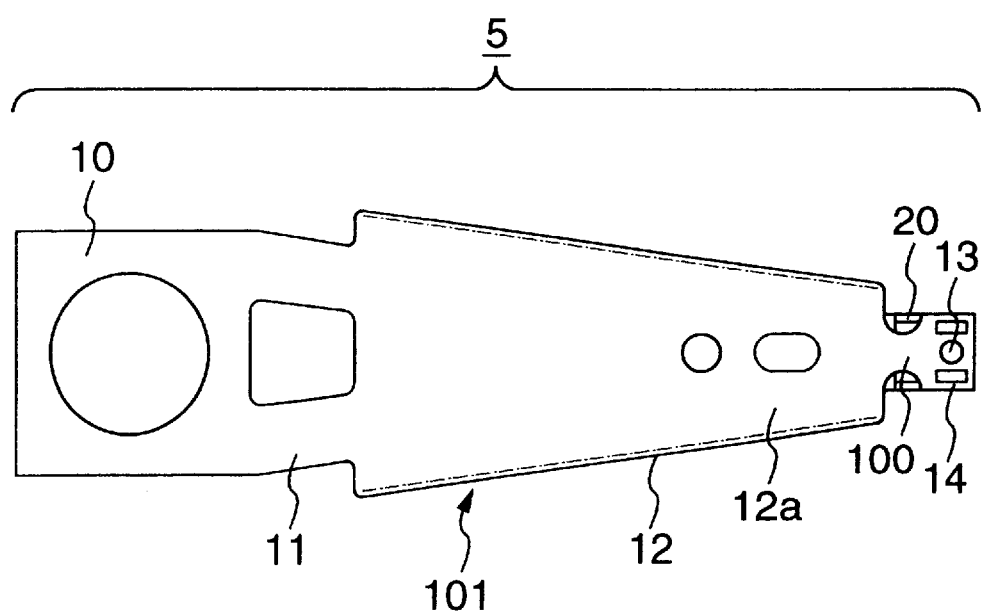
FIG. 2 is a magnetic-head supporting mechanism according to this invention.

FIG. 2 shows the overall magnetic-head supporting mechanism 5 according to the first embodiment. An arm mounting portion 10 connects to a spring portion 11, which connects to a flange portion 12. A constricted portion 100 is provided at the tip of the flange portion 12, and a pivot 13 and a roof 14 are provided at the tip of the constricted portion 100. The arm mounting portion 10, spring portion 11, and flange portion 12, constricted portion 100, pivot 13, and roof 14 are composed of a single member and are collectively referred to as a "load beam 101" below. This invention is explained in conjunction with the pivot provided at the tip of a flat portion 12a of the flange portion 12 for convenience. By bending the spring portion 11 through a predetermined angle prior to installation in the apparatus and mounting it approximately in parallel to the disc surface during installation, a plunge load on the slider 4 is generated by means of the flexure of the spring portion 11. The plunge load is transmitted through the flange portion 12 via the pivot 13 to the slider 4. Instead of providing the constricted portion 100, the tip side of the flat portion 12a can be continuously tapered where the pivot and roof can be provided. The configuration and operation of the roof are described below.

Figure 3A:
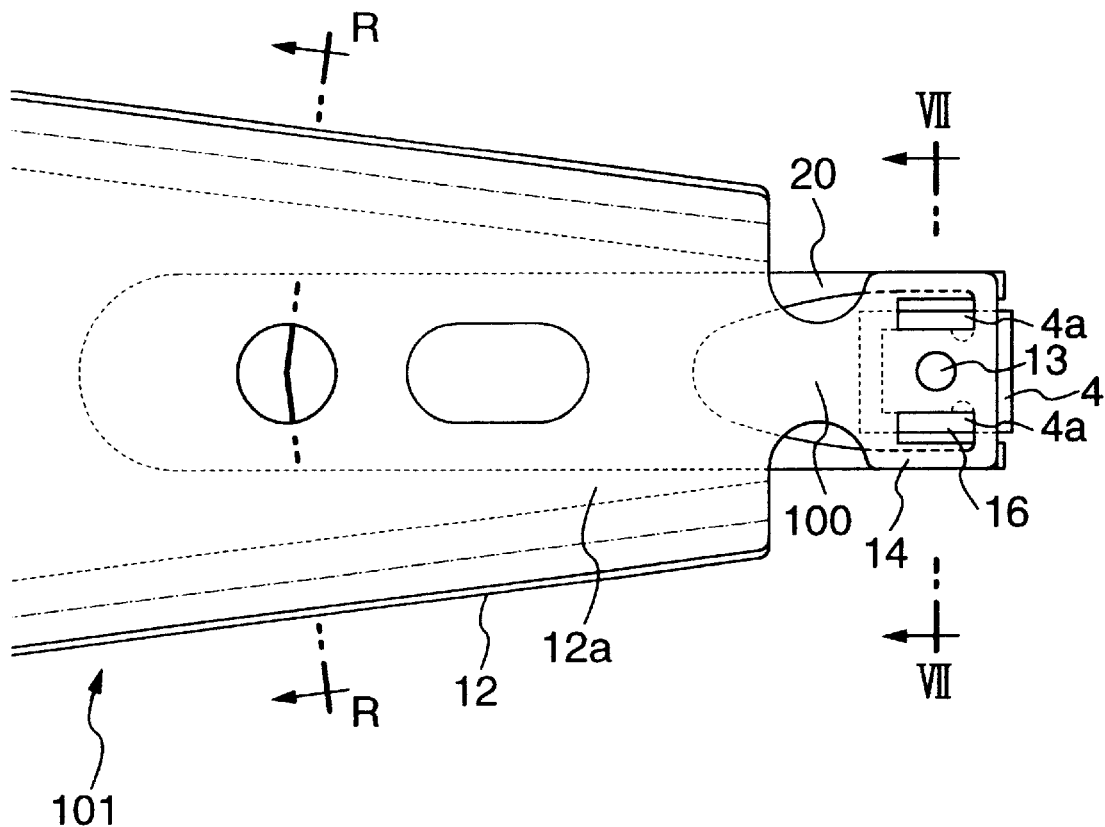
FIG. 3A is a detailed view of a tip of the magnetic-head supporting mechanism according to this invention.
Figure 3B:
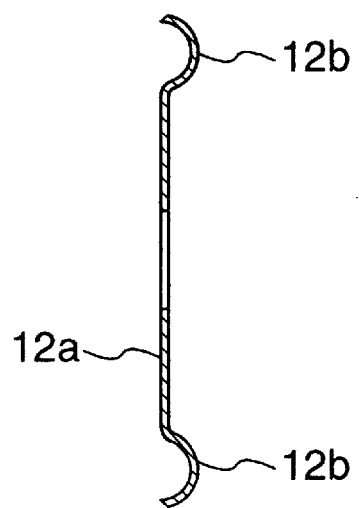
FIG. 3B is a sectional view of a load beam in FIG. 3A taken along line R—R.

FIG. 3A shows details of the tip of the magnetic-head supporting mechanism 5, and FIG. 3B shows the relationship between the flat portion 12a and a U-shaped bent portion 12b in a cross section of the load beam 101 taken along line R—R. The constricted portion 100 is provided at the tip of the flat portion 12a of the flange portion 12, and a portion of the flat portion 12a that is closer to its tip than the constricted portion has the pivot 13 and roof 14 thereon. In addition, the roof 14 has windows 16 used to admit ultraviolet rays and to allow the slider mounting state to be observed. A gimbal 20 is provided under the roof 14, and the slider 4 is mounted on the tip side of the gimbal 20 by means of adhesion. The width of the roof 14 is larger than or approximately equal to that of the gimbal 20, and its tip extends approximately as far as the tip of the gimbal 20.

In addition, as shown in FIG. 3, the windows 16 enable the rear surface of the slider 4 to be directly observed. In the figure, the lateral sides 4a (side edges) of the slider 4 can be observed through the width-wise centers of the windows 16 along the longitudinal direction. Thus, when the roof 14 is provided on the gimbal 20, it can be easily determined whether the slider 4 is mounted on the gimbal 20 at a predetermined angle. An ultraviolet-hardening adhesive can be used so that the mounting portion used to mount the slider 4 on the gimbal 20 is directly irradiated with ultraviolet rays (UV) through the windows 16 to harden the adhesive, thereby reducing the time required for adhesion and providing a predetermined adhesion strength. Light can enter a diagonal direction, so the direct underside (slider side) of the pivot 13-side edges of the windows 16 approximately aligns with the edges of the mounting portion used to mount the slider 4 thereon. The shapes and sizes of the mounting portion and windows are described below.

Figure 4:
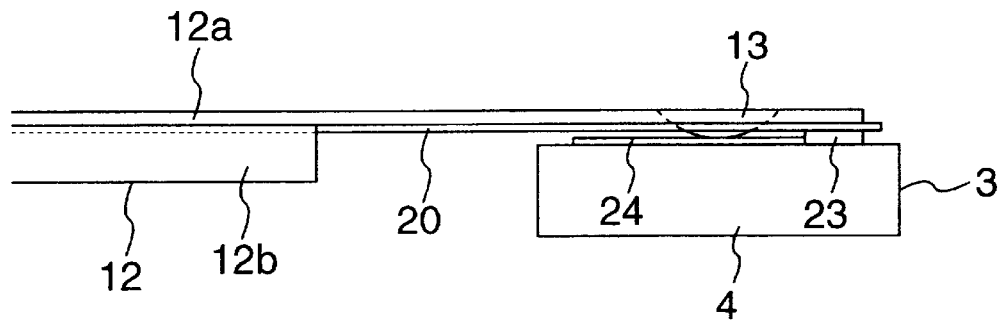
FIG. 4 is a side view of the magnetic-head supporting mechanism according to this invention.

FIG. 4 shows a side view of a magnetic head supporting mechanism according to a first embodiment. A pivot 13 is provided beyond the constricted portion 100 located on the tip side of the flat portion 12a of the flange portion 12. The gimbal 20 is mounted under the flat portion. The flange-side end surface of the gimbal 20 is welded to the flat portion 12a, while the other end reaches the slider 4 via a staged portion 23, with the slider mounted with an adhesive on the mounting portion 24 connecting to the staged portion. The top of the pivot 13 applies a load to the slider via the mounting portion 24.

Figure 5A:
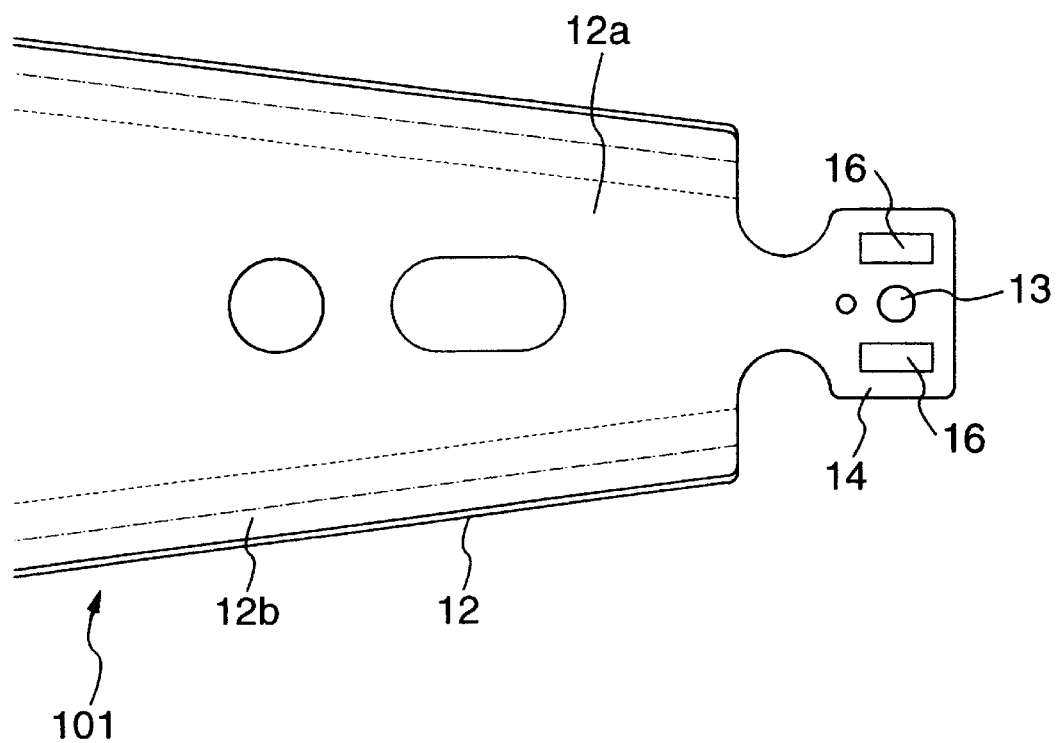
FIG. 5A is a top view of a roof portion of the load beam according to this invention.
Figure 5B:
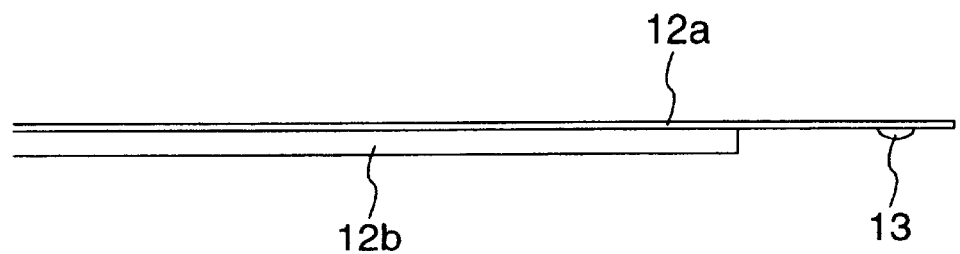
FIG. 5B is a side view of a roof portion of the load beam according to this invention.

FIG. 5 shows details of the roof portion of the load beam 101 according to the first embodiment. A sheet metal is etched to create the entire shape and windows, and the U-shaped bent portion of the flange 12b is molded by means of press working. The pivot 13, which is molded by means of press working, is located at the tip of the flat portion 12a, and the roof 14 is formed that have the two windows 16 around the pivot. The roof 14 and pivot 13 are formed of the same sheet metal as in the flat portion 12a.

FIG. 6 shows the shape of the gimbal used in this embodiment. The gimbal 20 is composed of a joint portion 21 in order to join the load beam; two flexible finger portions 22; and a staged portion 23; and a mounting portion 24 used to mount the slider 4. The flexible finger portions 22 support the slider 4 without restraining the movement of the slider 4 in the direction perpendicular to the slider floating surface (out-of-plane direction). The staged portion 23 prevents the slider 4 mounted on the mounting portion 24 from contacting the flexible finger portions 22, and enables pivot supporting so that the slider 4 can move freely. FIGS. 6B and 6C show an enlarged side view of a portion C and a projection from plane D—D.

The effects of this invention are described with reference to FIGS. 7, 8, and 9.

Figure 7A:
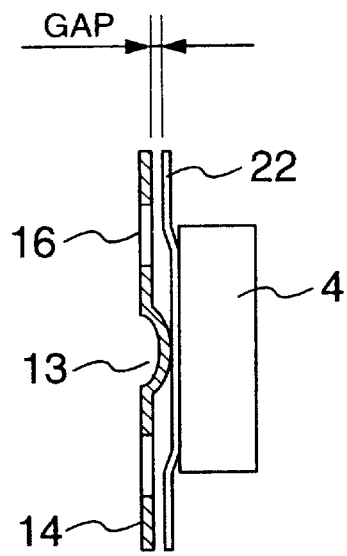
FIG. 7A is a sectional view of FIG. 3 taken along line VII—VII.
Figure 7B:
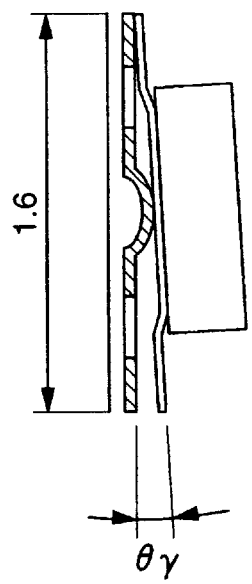
FIG. 7B shows a maximum rotation state of FIG. 7A.

FIG. 7A shows a cross section taken along line VII—VII in FIG. 3, and FIG. 7B shows the maximum rotation angle $\Theta r$ of the slider 4 in a roll direction. The thickness of the gimbal depends on the size of the slider (precisely speaking, air film rigidity), the height of the pivot depends on the stability of press working, and the thickness of the load beam is determined by the elastic modulus of the spring portion. According to this invention, even if the slider is rotated by an external impact, the tips of the flexible finger portions 22 contact the roof 14 to prevent the slider from rotating through a predetermined angle or more, as shown in FIG. 7B.

As shown in FIG. 7A, the size of the roof may be slightly larger than or equal to the size of the flexible finger portions. The rotation angle is affected by the gap between the roof 14 and the flexible finger portions 22, and can be reduced by reducing this gap. Even when the roof 14 is configured to be slightly smaller than the flexible finger portions 22, a predetermined angle can be obtained by setting a smaller gap.

Then, the maximum rotation angle $\Theta r Max$ in a roll direction is 3.2° (arctan (0.045/0.8)) if, for example, the roof width is 1.6 mm and if the gap between the roof 14 and the flexible finger portions 22 is 0.045 mm.

Figure 22A:
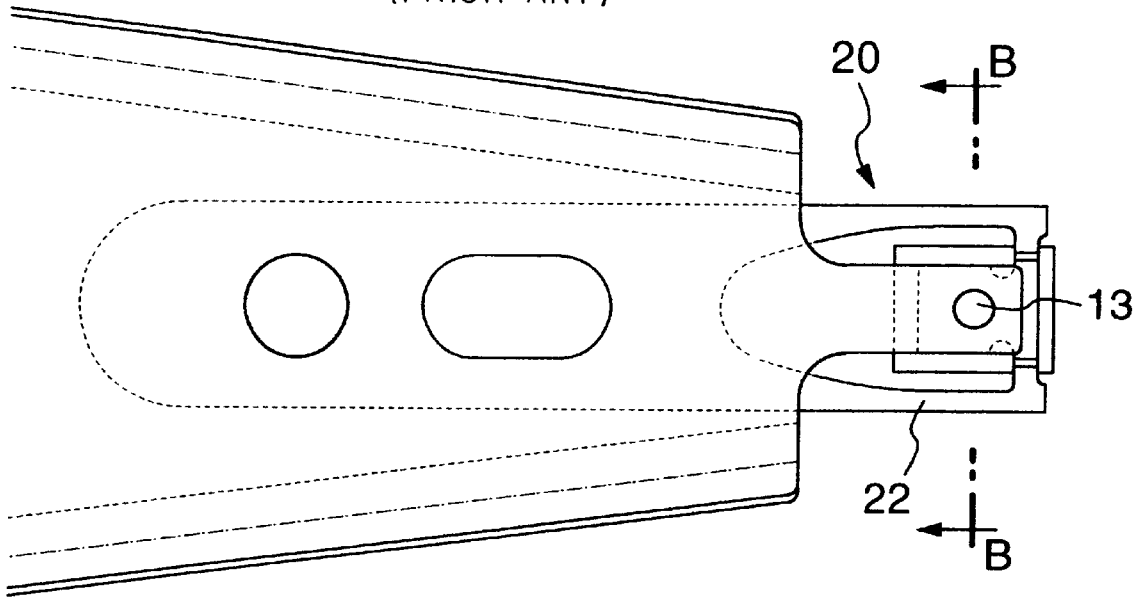
FIG. 22A shows a configuration of a conventional magnetic-head supporting mechanism.
Figure 22B:
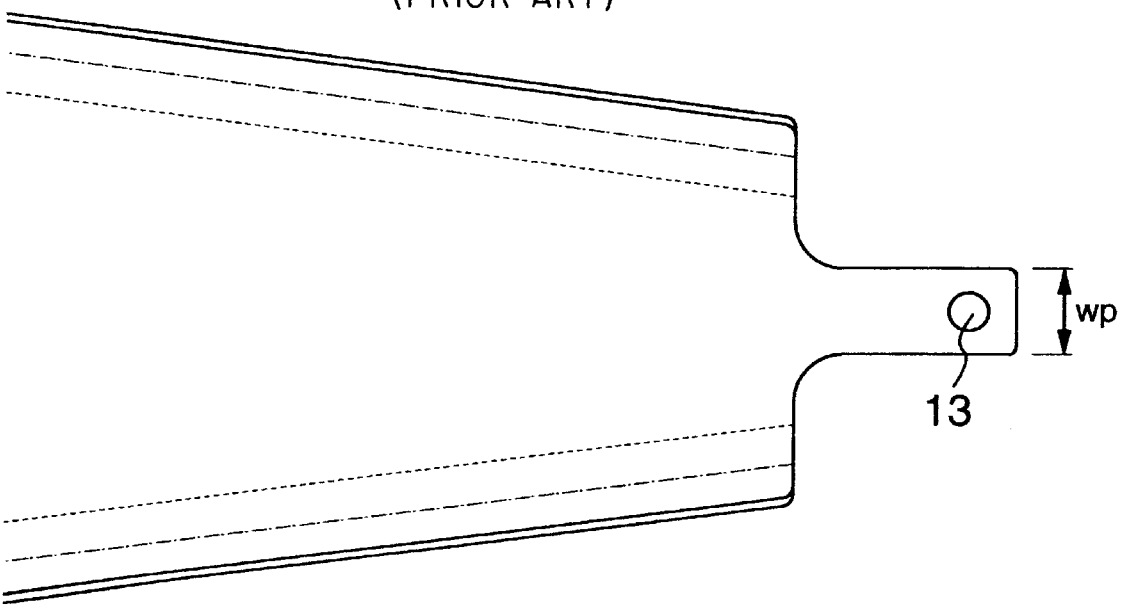
FIG. 22B shows a load beam in FIG. 22A.

On the other hand, a conventional magnetic head supporting mechanism, which is shown in FIG. 22A, does not have a roof but only a pivot 13 at the tip of the flange portion. Thus, nothing covers the top surface of a flexible finger portion 22 of the gimbal. For more clarity, FIG. 22B shows only a conventional load beam. As is apparent from a comparison between FIG. 22B and FIG. 5 for the first embodiment, the conventional magnetic head supporting mechanism does not include the roof portion according to this invention. In addition, the width of the conventional pivot 13 mounting portion does not include the roof according to the first embodiment of this invention.

Figure 23A:
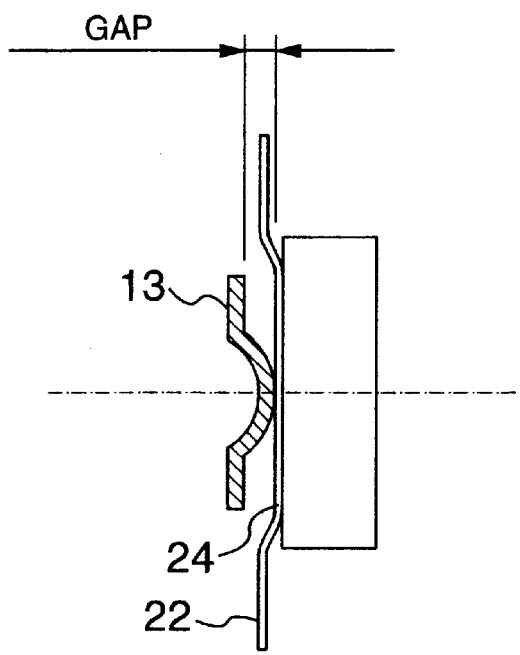
FIG. 23A is a sectional view of FIG. 22A taken along line B—B.
Figure 23B:
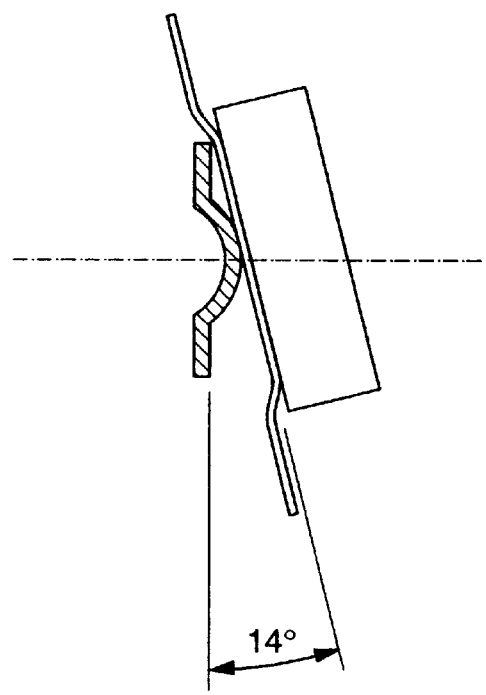
FIG. 23B shows a maximum rotation state of FIG. 23A.

FIG. 23A shows a cross section taken along line B—B in FIG. 22A. This figure shows that there is nothing on the top surface (opposed to the slider) of the flexible finger portion 22 that interferes with the movement of the portion 22, as described above. Thus, if the slider is rotated by an impact, the gimbal mounting portion 24 rotates until it contacts the side edge of the pivot 13.

Thus, if, for example, the gap between the mounting portion 24 and the side edge of the pivot is 0.089 mm and the width of the side edge of the pivot is 0.72 mm, the maximum rotation angle of the slider reaches 14° (arctan (0.089/0.36)). This is about four times as large as the value of the roofed magnetic-head supporting mechanism (=14°/3.2°).

Figure 9A:
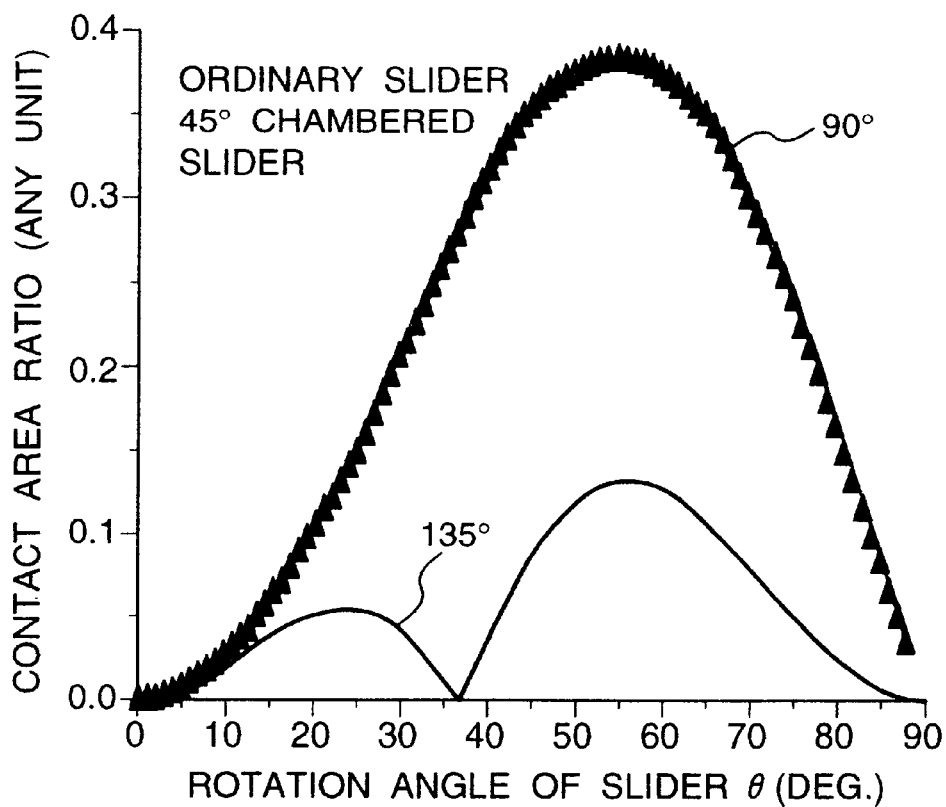
FIG. 9A compares a contact area obtained when the angle of a bleed portion is 90° with a contact area obtained when the angle of the bleed portion is 45°.

FIG. 9 shows the relationship between the angle and contact area measured when the slider contacts the disc surface after rotating through such a large angle. The horizontal axis indicates the rotation angle of the slider, while the vertical axis indicates the inverse of the contact area. This figure shows that as the angle value increases, the contact area decreases, that is, the contact area pressure increases, resulting in severer damage to the disc surface.

Figure 9B:
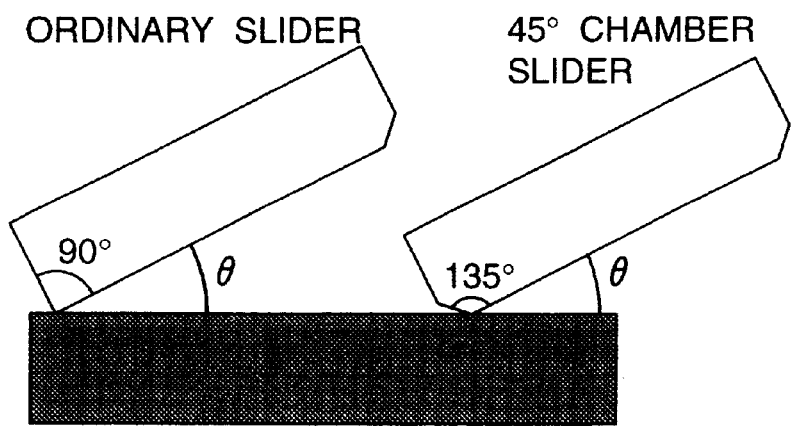
FIG. 9B shows a state in which the angle of the bleed portion is 90 or 45°.

In addition, as a condition for the above calculations, the angle of the bleed portion of the slider is set at 90° or this portion is chamfered at 45° (see FIG. 9B). When the contact area at a rotation angle of 14° is compared with the contact area at a rotation angles of 3°, this value is much smaller at 3° (10% or less). This effect remains unchanged if the discharge end of the slider is chamfered at 45° (the angle of the bleed portion is 135°).

This invention can reduce the rotation angle of the slider down to 3° compared to 14° in the prior art, thereby reducing the damage to the disc surface down to one-tenths or less.

Figure 8A:
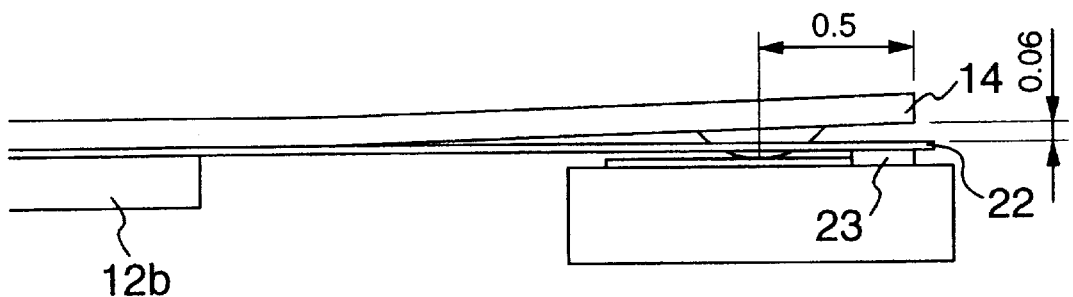
FIG. 8A shows a maximum pitch angle according to a first embodiment.

FIGS. 8A and B show a comparison of the maximum pitch angle of the tip of the gimbal according to the first embodiment ($\Theta p=7°$=arctan (0.06/0.5)) with a conventional maximum pitch angle ($\Theta p=15°$=arctan (0.10/0.38)). In the first embodiment, even when the slider rotates in a pitch direction (forward inclination), the tip of the flexible finger portion 22 contacts the roof 14 to limit the rotation to a small range. The contact angle during rotation is 7° (=arctan (0.06/0.5)) if, for example, the length from the pivot to the tip of the roof is 0.5 mm and if the gap between the roof and the flexible finger portion 22 is 0.06 mm. Thus, the slider does not rotate through 7° or more.

According to this embodiment, the tip of the roof extends approximately as far as the tip of the flexible finger portion 23. If the tip of the roof is extended beyond the tip of the flexible finger portion, for example, to behind the magnetic head of the slider, the maximum pitch angle cannot be reduced and in fact, the weight of the load beam increases to reduce the natural frequency of the magnetic-head supporting mechanism or the access speed.

In addition, if a signal line from the magnetic head provided at the rear end of the slider is drawn in the direction perpendicular to the floating surface, that is, in the direction of the load beam and if the roof is extended to behind the magnetic head of the slider, then the roof may interrupt the routing of the signal line. Thus, it is most preferable that the tip of the roof 14 extend approximately as far as the flexible finger portion of the gimbal.

Figure 8B:
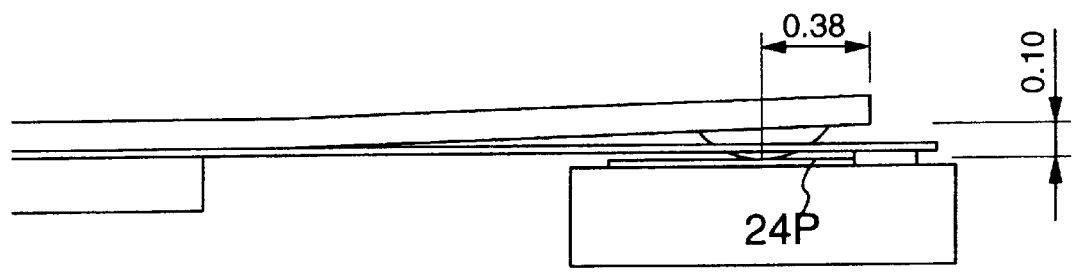
FIG. 8B shows the maximum pitch angle of a conventional magnetic-head supporting mechanism.

As shown in FIG. 8B, the conventional apparatus has no roof, so the distance from the top of the pivot to the tip of the load beam is short and the mounting portion 24 rotates until it contacts the tip of the load beam. The contact angle during rotation is 15° if, for example, the length from the pivot to the tip of the roof is 0.38 mm and if the gap between the roof and a mounting portion 24 is 0.1 mm. With such arrangement the maximum rotation angle of pitch can be reduced to 46% of the conventional arrangement by providing the roof.

In addition, the above calculated angle varies with the height of the pivot and the shape of the gimbal or load beam, but the effects of the roof according to this invention remain unchanged.

As described above, in the first embodiment of this invention, the magnetic-head supporting mechanism includes the roof that controls the position of the slider. Thus, after a large impact is effected on the disc apparatus to cause the slider to jump, the position of the slider can be controlled when it contacts the disc, thereby reducing the contact area pressure between the slider and the disc. Thus, this invention can provide a magnetic-head supporting mechanism having a high impact resistance and improve the impact resisting capability of the magnetic-disc apparatus in which the magnetic-head supporting mechanism is mounted. In addition, by providing an ultraviolet intake window used to harden an adhesive and a window used to observe how the slider is mounted with the roof, the productivity of the magnetic head supporting mechanism can be improved.

A second embodiment of this invention is described with reference to FIGS. 10A and 10B. This figure shows only the roof portion of this embodiment in detail. The other sites are the same as in the first embodiment, so they are omitted. The second embodiment differs from the first embodiment in that it has a rotation angle adjustment groove 40 in the roof portion.

This groove is provided on the flexible finger portion of the gimbal to adjust the gap between the flexible finger portion and the roof. Specifically, according to the first embodiment, the gap between the flexible finger portion 22 and the roof 14 is 0.045 mm and the maximum rotation angle is 3.2°, as shown in FIG. 7A. This gap can be controlled to adjust the contact angle.

According to the first embodiment, the height of the pivot is used to control the gap. On the other hand, since the pivot is molded by press working, its height and accuracy are limited. The second embodiment includes a staged roof 17 having the rotating angle adjustment groove 40 in the gimbal-opposed surface of the roof according to the first embodiment.

The depth of the rotation angle adjustment groove 40 can be varied to control the gap. This eliminates the need to control the gap (rotation angle) and requires only the height of the pivot to be controlled, thereby increasing the degree of freedom. Furthermore, the depth of the rotation angle adjustment groove can be accurately controlled by means of machining or etching to accurately control the maximum rotation angle. For the impact-resisting magnetic-head supporting mechanism to achieve stable floating, when no impact is applied, the contact between the gimbal and the roof must be avoided despite machining variation during the manufacturing of the pivot, whereas when an impact is applied, the slider must be stopped by minimizing the rotation angle.

This embodiment can meet this requirement because the staged roof can be used to control the gap between the gimbal and the roof. As described above, this embodiment can control the rotation angle of the slider to improve the impact resistance as in the first embodiment, and can also improve productivity using the ultraviolet incidence window and the adhesion condition observation window.

Figure 11:
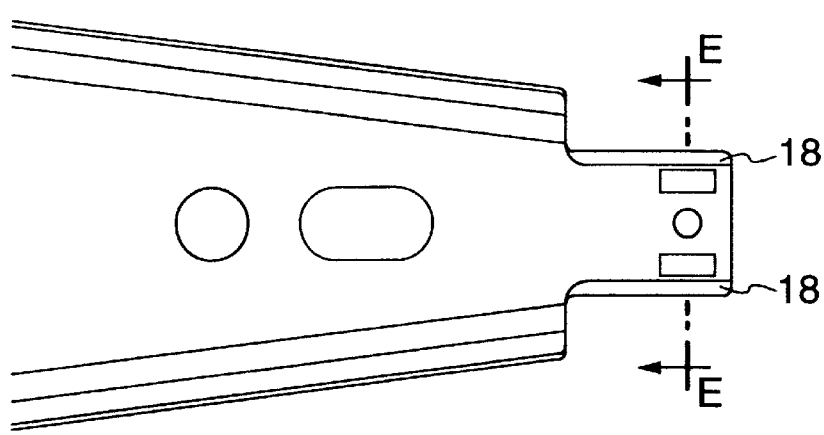
FIG. 11 is a top view of a load beam according to a third embodiment of this invention and FIG. 11A is a cross-sectional view thereof.
Figure 11A:
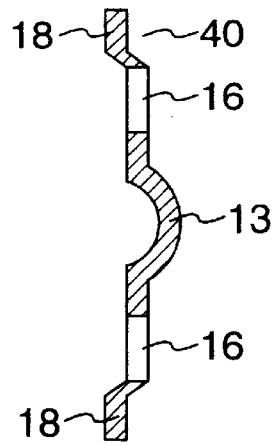

A third embodiment of this invention is described with reference to FIG. 11. This embodiment differs from the second embodiment in that the rotation angle adjustment groove 40 is staged by means of press working. Thus, the height of the staged roof is different from that of the windows as shown in FIG. 11. On the other hand, the rotation angle adjustment groove 40 is provided in the top surface of the flexible finger portion of the gimbal via a predetermined gap as in the second embodiment. The staged roof with the rotation angle adjustment groove 40 improves the degree of freedom in design for the height of the pivot, thickness of the gimbal, and the thickness and length of the load beam, as in the second embodiment. In addition, since the staged roof can be press-worked simultaneously with the pivot 13, this embodiment provide better productivity (mass productivity) than the second embodiment. This embodiment also provides high impact resistance and mass productivity as in the first embodiment.

Figure 12A:
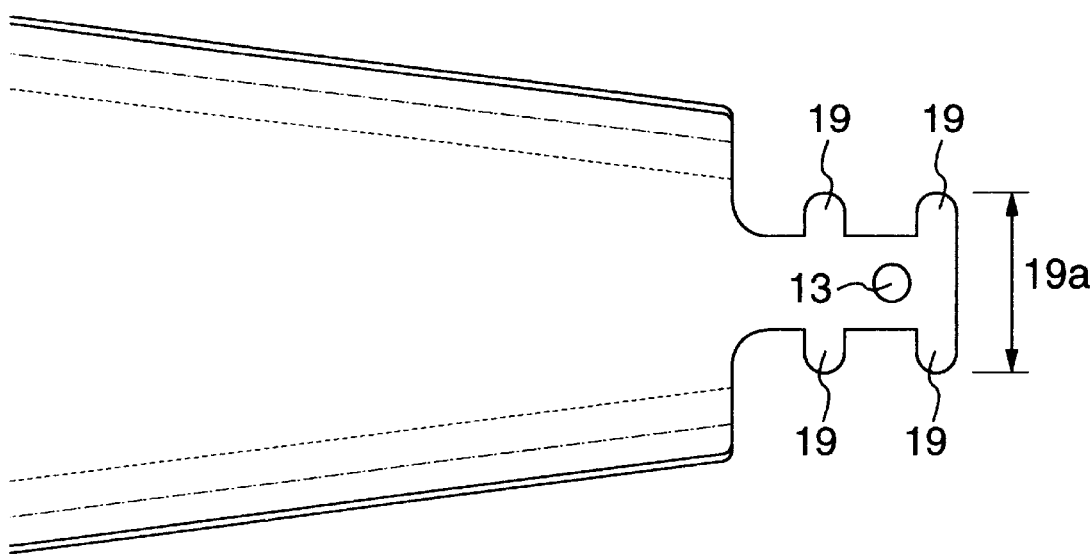
FIG. 12A is a top view of a load beam according to a fourth embodiment of this invention.
Figure 12B:
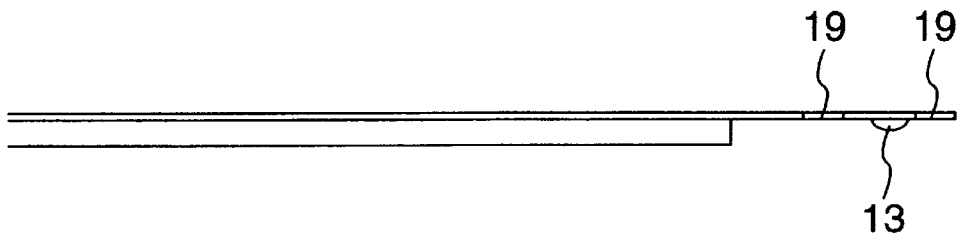
FIG. 12B is a side view of the load beam according to the fourth embodiment of this invention.

A fourth embodiment of this invention is described with reference to FIGS. 12A and 12B. This embodiment differs from the first embodiment in that it uses a four-point pressing roof 19.

The roof 19 has four protrusions, the tip of which corresponds to the size (position) of one of the four corners of the roof 14 according to the first embodiment. The width 19a of the four protrusions is approximately the same as that of the gimbal. In addition, the tip of the protrusion extends approximately as far as the tip of the gimbal. Since only the four points of the gimbal are pressed, the ultraviolet incidence window and adhesion condition observation window, which are required by the first embodiment, can be omitted to reduce the tare weight of the roof portion.

Thus, the impact resistance and productivity can be improved as in the first embodiment. Furthermore, the reduced weight of the roof portion precludes the natural frequency of the magnetic-head supporting mechanism from decreasing. This in turn enables the magnetic head to be positioned promptly and accurately.

Figure 13A:
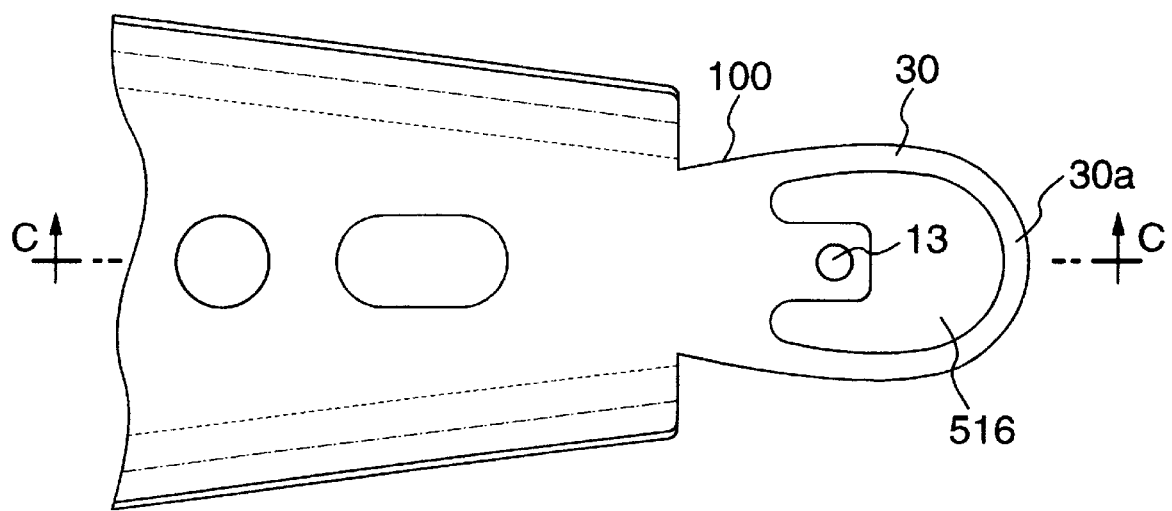
FIG. 13A is a top view of a load beam according to a fifth embodiment of this invention.
Figure 13B:
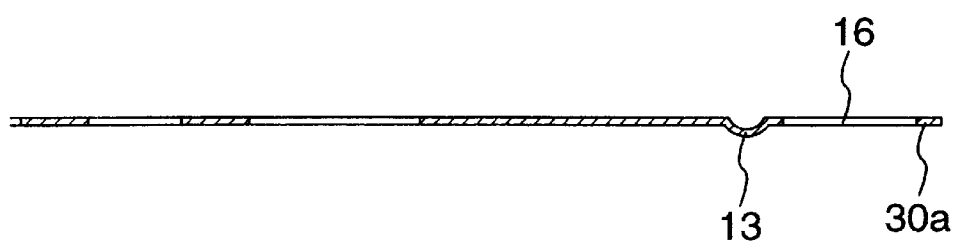
FIG. 13B is a sectional view of FIG. 13A taken along line C—C.

A fifth embodiment of this invention is described with reference to FIGS. 13, 14, and 15. FIGS. 13A and 13B show details of a roof portion of a load beam according to the fifth embodiment. This invention differs from the first embodiment in that a ring-shaped roof 30 is provided at the tip of the flat portion of the flange portion.

The ring-shaped roof 30 is shaped like a donut and has a window at its center. The pivot 13 is mounted at the tip of the flat portion as in the first embodiment, and the ring-shaped roof 30 extends from both sides of the flat portion of the pivot 13 to form ring-shaped roof. FIG. 13B also shows a cross section taken along the centerline C—C of the load beam. As shown in this cross section, the pivot 13 protrudes toward the slider mounting portion as in the first embodiment. In addition, the roof tip 30a is separated from the pivot 13 by a window 516.

In addition, the first embodiment includes the two windows 516 along the sides of the slider, but the fifth embodiment has only one by increasing the size of the window 516 above the width of the slider. Thus, as in the first embodiment, after the slider 4 has been mounted on a mounting portion 524 of the gimbal using an adhesive, ultraviolet rays can be irradiated through the window 516 to allow the adhesive to be hardened in a short time. Furthermore, when mounted on the mounting portion 524, the slider 4 can be supported from the load beam side through the window 516. This feature allows the slider to be mounted easily.

FIG. 14 shows the gimbal portion of the fifth embodiment. Its basic structure is the same as that of the gimbal configuration (FIG. 6) according to the first embodiment, and this gimbal is composed of a flexible finger portion 522; a staged portion 523; and a mounting portion 524. This differs from the gimbal according to the first embodiment in that the flexible finger portion is shaped like a ring with a curvature and in that a constricted portion 524a is provided in the mounting portion 524 of the slider. The ring shape of the flexible finger portion enables the further reduction of the effect of the restraint of the movement of the slider in the out-of-plane direction perpendicular to the floating surface of the slider. In addition, the slider is mounted on the mounting portion 524 so as not to be caught by the constricted portion 524a. Thus, the constricted portion 524a works like the flexible finger portion 522 to enable the slider to be supported without restraining its movement perpendicular to its floating surface (pitching, rolling, vertical movement).

In summary, as the miniaturization of the slider advances, its air film rigidity decreases so the gimbal is required to support the slider without restraining its movement in the out-of-plane direction (perpendicular to the floating surface). Thus, the gimbal according to this invention has the constricted portion 524a to reduce the pitching and rolling rigidity of the gimbal in order to support the slider with the reduced restraint of its movement.

FIG. 15 shows a general view of the fifth embodiment. As shown in FIG. 15A, the ring-shaped roof 30 is formed to overlap the top surface of the flexible finger portion 522, and the roof tip 30a is formed to generally overlap two staged portion 523 provided at the tip of the gimbal. The roof tip 30a, however, does not extend beyond the tip of the gimbal.

FIG. 15B shows a cross section taken along line D—D in FIG. 15A. The ring-shaped roof 30 has approximately the same width as the flexible finger portion 522 so as to cover its top surface. The slider mounting surface 524 can be viewed through the window 516 in the ring-shaped roof 30. As described above, the slider mounting surface 524 can be irradiated with ultraviolet rays through the window 516 to harden the adhesive between the slider and the mounting surface in a short time. The slider is mounted directly under the mounting portion 524, so it is not shown. Of course, ultraviolet rays may be directly applied to the adhesive or may be diagonally incident as reflected (scattered) light.

The width of the window 516 is larger than that of the mounting portion 524 of the slider. Thus it is possible to support the mounting portion through the window 516 and it is easy to achieve the mounting portion through the window when the slider is mounted on the mounting portion.

The effects of this invention are described with reference to the explanatory drawing in FIG. 15C. According to this embodiment, even if an impact causes the slider to roll (lateral rotational movement), the ring-shaped roof 30 provided on the flexible finger portion 522 restrains the movement of the slider to prevent it from rotating through a large angle, as in the first embodiment. This feature in turn reduces the contact area ratio shown in FIG. 9 and thus contact damage to the disc.

In addition, with respect to the pitching movement (longitudinal rotational movement) of the slider caused by an impact, the roof tip 30a covers the tip of the gimbal, so the gimbal, which rotates with the slider, contacts the roof to hinder the slider from rotating through a large angle in the pitching direction. This feature reduces the contact area ratio and thus contact damage to the disc, as described above.

Since the mechanical rigidity of the roof is higher than that of the gimbal, the gimbal, which moves with the slider, can of course be precluded from being deformed. Again, what is important in this embodiment is that the tip of the roof does not extend beyond the tip of the gimbal and that the roof has approximately the same shape as the gimbal. This configuration minimizes the increase in the mass of the load beam due to the provision of the roof and reduces the rotation of the slider caused by an impact. If the roof is larger than the gimbal, the mass of the load beam increases to significantly increase the reduced mass of the head from the rotational center of the carriage, thereby reducing the data access speed.

In this case, the natural frequency and the positioning accuracy of the magnetic head also decrease. Furthermore, even if the roof is larger than the gimbal, its effects are still the same as those of a roof that is as large as the gimbal. This is because the rotation angle restrained by the roof is not changed by setting the width of the roof larger than that of the gimbal.

As described above, this embodiment provides effects similar to those of the first embodiment. It also can provide an impact-resisting magnetic-head supporting mechanism optimal for a slider of a small air film rigidity.

Figure 16:
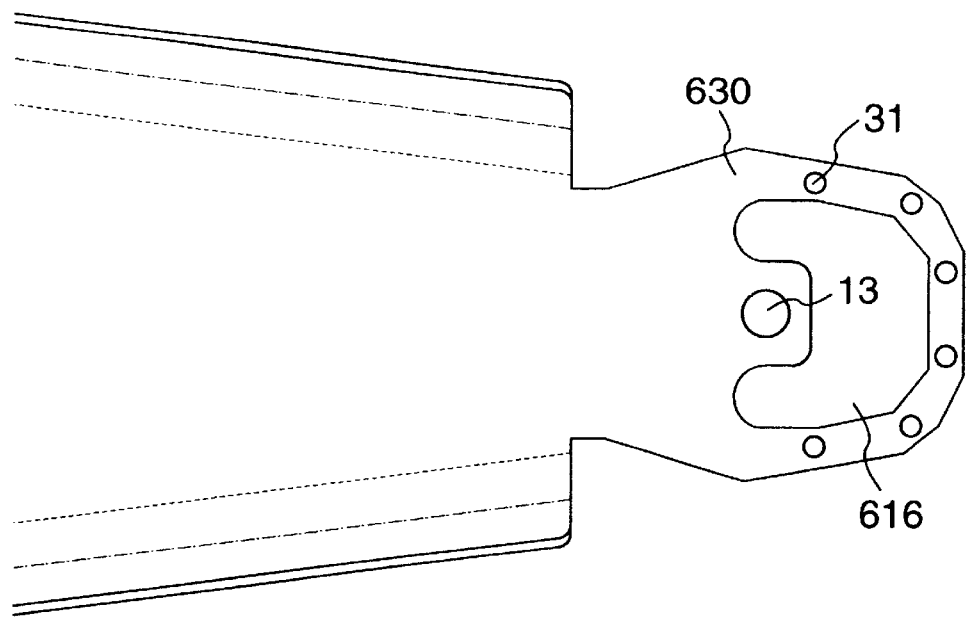
FIG. 16 is a top view of a load beam according to a sixth embodiment of this invention.

FIG. 16 shows a sixth embodiment of this invention. This embodiment differs from the fifth embodiment in that a window 31 is provided in a roof 630. The window 31 serves to reduce the weight of the roof. This configuration can reduce the inertia moment of the magnetic-head supporting mechanism that uses the pivot bearing 7 of the carriage 9 as a rotational center to enable fast seek operations.

If the external impact has a large value, the roof is deformed and cannot control the position of the slider. To solve this problem, the rigidity of the roof must be improved. Although the width or thickness of the roof can be increased to improve its static rigidity, doing this increases the tare weight of the roof and makes it too flexible (a decrease in dynamic rigidity). In addition, the inertia moment increases that uses the pivot bearing 7 as a rotational center. This embodiment provides the window 31 in the roof 630 to improve the rigidity without increasing the mass of the roof 630. Consequently, the impact resistance of the magnetic-head supporting mechanism can be further improved.

Figure 17:
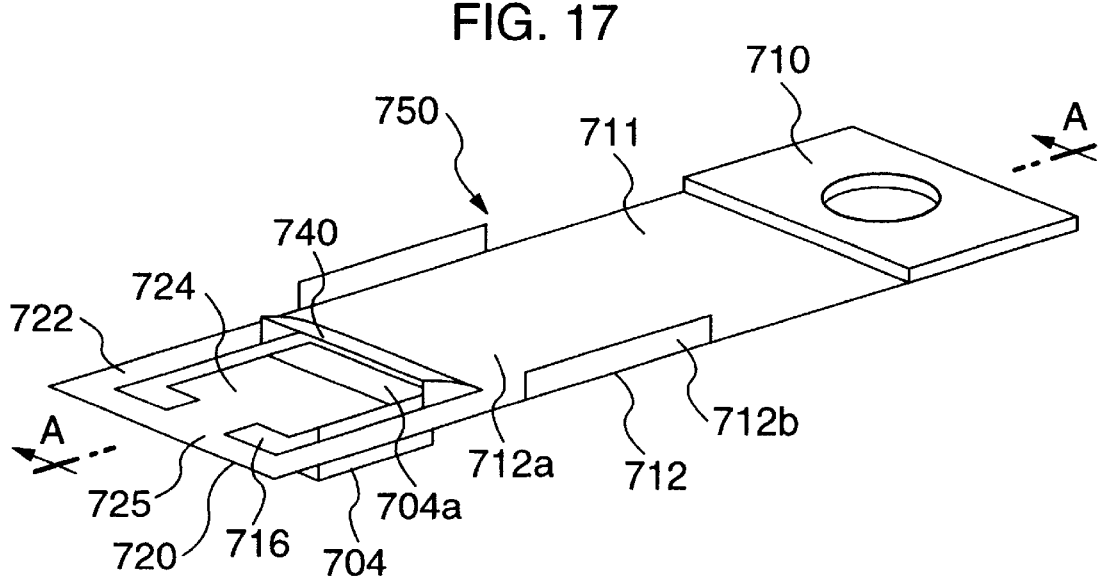
FIG. 17 is a perspective view of a seventh embodiment of this invention.
Figure 18:
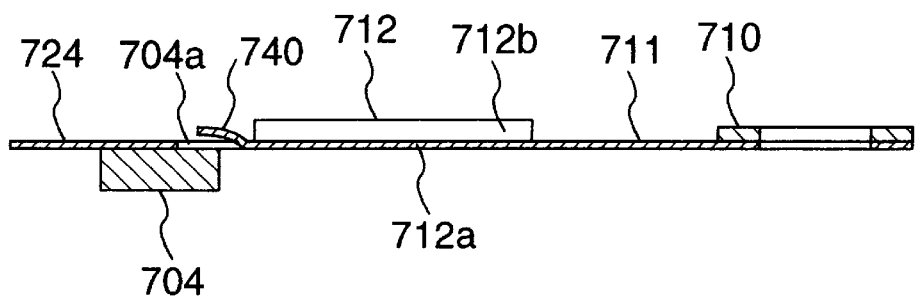
FIG. 18 is a sectional view of FIG. 17 taken along line A—A.

FIGS. 17 and 18 show a seventh embodiment of this invention. This embodiment differs from the first embodiment in that the gimbal and the load beam are integrated together and that the pivot is omitted.

A slider 704 is mounted on a mounting portion 724, which connects to a horizontal frame 725, and two flexible finger portions 722 extend from the respective sides of the horizontal frame to connect to a flange portion 712. At a slider-side end of a flat portion 712a of the flange, a roof 740 is provided over a rear surface 704a of the slider. The roof 740 is molded simultaneously with the press working of an L-shaped bent portion 712b of the flange portion 712. FIG. 18 shows that the roof 740 is provided over the rear surface 704a of the slider. The roof 740 has the same effects as in the first embodiment and prevents the slider 704 from rotating through a large angle due to an impact. That is, the roof 740 restrains the rotation of the slider to reduce the contact angle between the slider and the disc. Thus, this embodiment can improve impact resistance as in the first embodiment.

Figure 19:
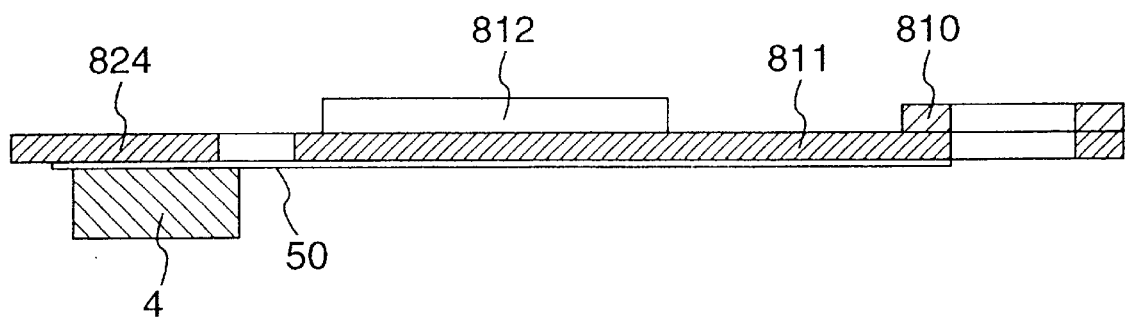
FIG. 19 is a side view showing an eighth embodiment of this invention.
Figure 20:
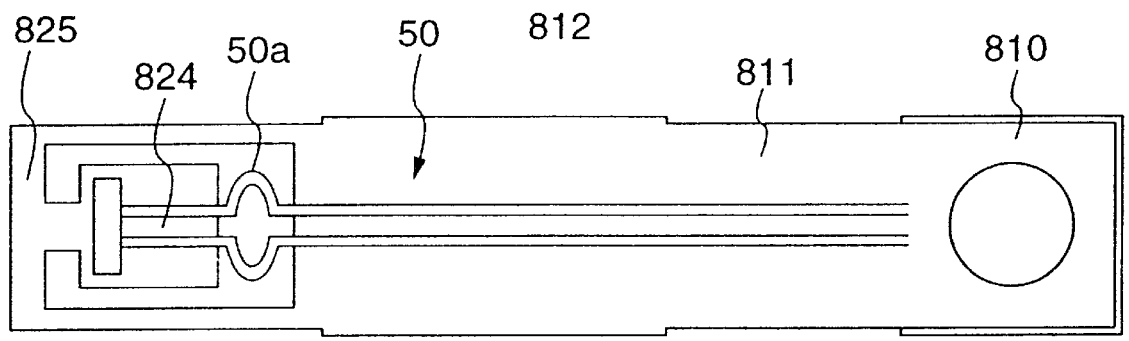
FIG. 20 is a bottom view of FIG. 19 (without slider)

An eighth embodiment of this invention is described with reference to FIGS. 19, 20, and 21. In FIG. 20 the slider is not mounted. This embodiment differs from the seventh embodiment in that instead of the roof, a flange portion 812 is joined with a mounting portion 824 using a FPC 50. The FPC 50 has a loop-like flexed portion 50a so as not to hinder the slider from floating.

Figure 21:
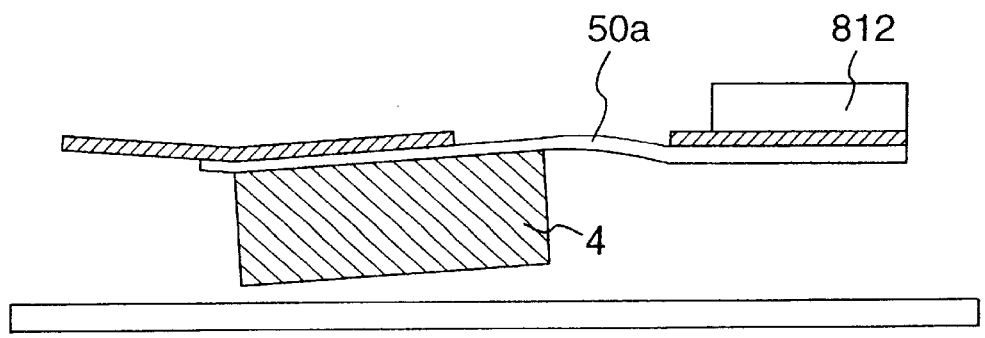
FIG. 21 describes the effects of this invention.

If an impact is input, the flexed portion 50a of the FPC 50 restrains the movement of the slider 4 as shown in FIG. 21. This prevents the slider 4 from rotating through a large angle due to the impact. Thus, this embodiment provides effects similar to those of the seventh embodiment. Of course, by providing the roof as shown in the first to seventh embodiments, the rotation of the slider caused by the impact can be reliably restrained. Although this embodiment connects the mounting portion 824 and the flange portion 812 together using the FPC, similar effects can be obtained using an elastic material other than the FPC that is not very rigid and that can resist tensile force. The FPC is mounted on the mounting portion 824 and the flange portion 812 by using an adhesive. The loop-like flexed portion 50a, mounting portion 824, and horizontal frame 825 shown in FIG. 21 are collectively referred to as a "flexure". The FPC 50 may be integrally formed with the FPC (not shown) for writing or reading signals of the magnetic head.

This invention can control the contact angle between the slider and the disc, thereby providing a magnetic-head supporting mechanism that can reduce damage to the slider and disc caused by their contact in order to provide high impact resistance, that exhibits high productivity using the ultraviolet incidence window, adhesion condition observation window, and slider holding window, and that is suitable for a small slider due to the decrease in the rigidity of the gimbal.

What is claimed is:

1. A magnetic-head supporting mechanism comprising a slider including a magnetic head that writes and reproduces data to and from a magnetic disc and that has a floating surface floating above the surface of said magnetic disc; a mounting portion on which said slider is mounted; a horizontal frame connected to one end of said mounting portion; two flexible finger portions extending from the respective ends of said horizontal frame to the respective sides of said mounting portion; a joint portion connected to other ends of said flexible finger portions and joined with one end of a beam portion; a spring portion having one end connected to the other end of said beam portion; and an arm mounting portion connected to the other end of the spring portion, wherein:

said slider and said beam portion are joined together by using an elastic member having at least one loop-like flexed portion arranged in a region of a gap between facing sides of said mounting portion and said beam portion and which is not very rigid and has a high tensile strength in order to provide predetermined flex.

2. A magnetic-head supporting mechanism according to claim 1 wherein said elastic member is a FPC that transmits signals between the magnetic head and a control section.

3. A magnetic-head supporting mechanism according to claim 1, wherein said beam portion includes a sheet of metal plate.

4. A magnetic-head supporting mechanism according to claim 1, wherein said elastic member includes two loop-like flexed portions extending in opposite directions.

5. A magnetic-head supporting mechanism according to claim 1, wherein said elastic member limits rotational movement of said slider.

6. A magnetic-head supporting mechanism according to claim 1, wherein said at least one loop-like flexed portion of said elastic member limits rotational movement of said slider.

* * * * *